United States Patent [19]
Wald

[11] Patent Number: 5,449,061
[45] Date of Patent: Sep. 12, 1995

[54] APPARATUS FOR THE TRANSPORT OF PRODUCTS

[75] Inventor: Ulrich Wald, Hassloch, Germany

[73] Assignee: Paper Converting Machine GmbH, Schifferstadt, Germany

[21] Appl. No.: 215,336

[22] Filed: Mar. 21, 1994

[30] Foreign Application Priority Data

Apr. 30, 1993 [DE] Germany .......................... 9306508 U

[51] Int. Cl.⁶ ............................................. B65G 19/26
[52] U.S. Cl. ..................................... 198/732; 198/737; 198/742
[58] Field of Search ............. 198/468.9, 468.1, 468.11, 198/468.2, 621, 719, 725–728, 732, 737, 740–746, 748; 414/745.1, 745.7, 746.8, 750, 751; 144/245 E, 245 A; 83/435.1, 435.2

[56] References Cited

U.S. PATENT DOCUMENTS

| | | | |
|---|---|---|---|
| 3,062,353 | 11/1962 | Opperthauser | 198/742 X |
| 3,301,374 | 1/1967 | Proctor | 198/742 |
| 3,417,852 | 12/1968 | Kidd | 198/737 X |
| 3,513,967 | 5/1970 | Sheppard | 198/742 X |
| 4,147,259 | 4/1979 | Nilsson | 414/746.8 |
| 4,417,653 | 11/1983 | Zwezerynen | 198/732 X |
| 4,638,904 | 1/1987 | Randar et al. | 198/468.2 |
| 4,996,900 | 3/1991 | Schmidt et al. | 198/468.2 X |
| 5,052,885 | 10/1991 | Foster | 414/746.8 |
| 5,070,918 | 12/1991 | Pallmann | 144/245 A X |

Primary Examiner—D. Glenn Dayoan
Attorney, Agent, or Firm—Panitch Schwarze Jacobs & Nadel

[57] ABSTRACT

An apparatus is provided for the transport of products in the course of a packaging process, where at least two pushers, pivotably mounted along a guide rod, are driven by a traction mechanism alternately back and forth in opposite directions along a product track. The pivotable mountings allow their respective pushers to swing between active and passive positions so that in the active position the pusher moves a product in one direction along the track, while a pusher in the passive position is pivoted away from the track while being driven in the opposite direction to return to a starting point. Upon reaching the starting point, the pusher in the passive position is pivoted back to the active position for moving the next product. The traction mechanism is preferably a toothed belt which is driven by a servomotor with a programmable speed profile, and the pushers are preferably connected to the traction mechanism by overload couplings. The pivoting movement of the pushers is preferably generated by curved tracks which are connected at their ends by shunt switches.

9 Claims, 3 Drawing Sheets

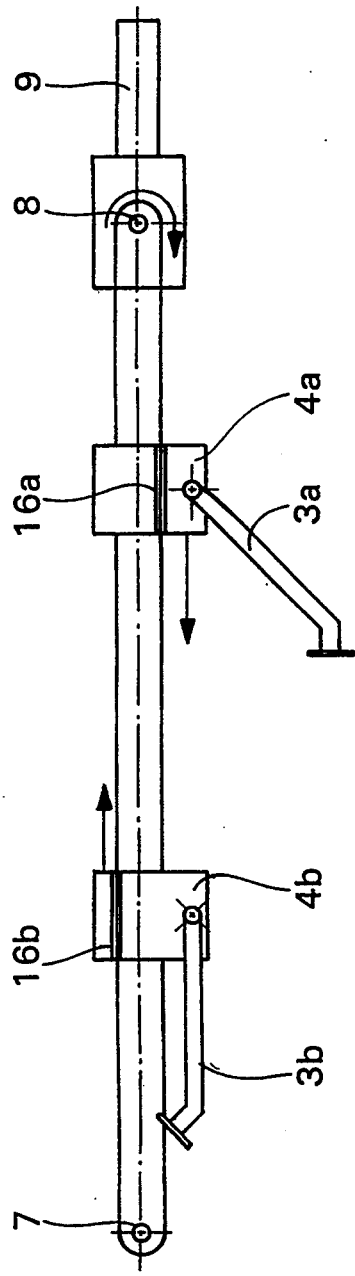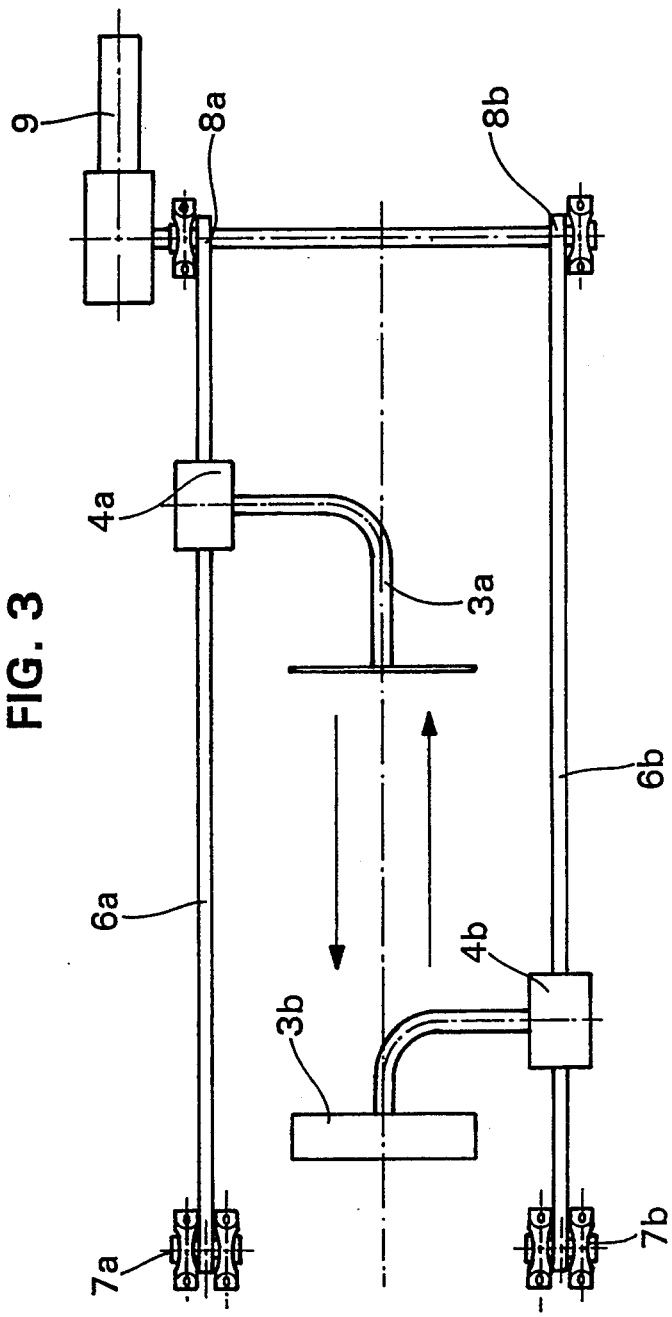

APPARATUS FOR THE TRANSPORT OF PRODUCTS

FIELD OF THE INVENTION

The invention involves an apparatus for the transport of products within the context of the packaging process with the help of two pushers that work in opposite directions, go back and forth, and can swing, and that alternately move a product along a track in the desired direction, whereby the pusher that is momentarily inactive returns, in a passive position in which it is swung away from the track, to a starting point that corresponds with the next product, where it is again swung into the active position.

BACKGROUND OF THE INVENTION

Pushers of such a type are used primarily to push a product, by which is also meant groups of products arranged alongside one another and/or one above the other, into a packaging bag. To do this, it is the usual practice to drive the pushers by means of crank-and-rocker linkages and swing arms, so that on the one hand they carry out the back-and-forth transport movement along the track, and on the other hand they carry out a swinging movement perpendicular to the track so that they do not collide with the swivel arm coming in the opposite direction. For reasons of space, the crank-and-rocker linkages and the swing arms are arranged on both sides of the track, whereby, because of the given transport path for the products, they nearly cover the entire side of the transport apparatus. The expenditure in terms of the equipment needed for driving the swing arms thus becomes relatively high; access to the transport track is made more difficult; and the risk of accident is increased for the operators of the equipment.

SUMMARY OF THE INVENTION

Starting from this point, the present invention achieves the object of improving the transport apparatus described in the Field of the Invention in such a way that it distinguishes itself through compact, cost-effective design. In addition, the risk of accident is reduced as well.

This object is achieved in accordance with the invention by virtue of the fact that the pushers are pivotably mounted on at least one guide rod in a manner that allows them to travel in the direction of transport, and that their drive takes place by means of at least one traction mechanism, particularly toothed belts, chains, cables, or the like that alternately move them back and forth.

This yields the advantage that the long and heavy crank-and-rocker linkages and swivel arms of the prior art are dispensed with, and the drive comprises only stationary guide rods and one or two traction mechanisms, belts in particular, that run back and forth. The masses moved are substantially smaller, and the drive correspondingly simpler, more compact, and more cost-effective.

In principle, both pushers can be driven by the same belt, by using an endless toothed belt which circulates over two reversing pulleys; one of the pushers being connected to the upper run of this belt, and the other pusher being connected to the lower run. Usually however, it is better to assign each pusher to its own toothed belt and then connect both toothed belts to a common drive. In place of an endless belt, it is expedient to use a belt whose ends are secured in a joining element with tension lugs. In this case the belt tension can be adjusted by means of the joining element without it being necessary to change the distance between the axles of the reversing pulleys.

An especially expedient additional future of the invention comprises having the drive implemented by means of a servomotor with a programmable speed profile. This makes possible a smooth start-up and deceleration, and thus a gentle handling of the products, which are often soft, paper hygiene products. In particular, the acceleration and deceleration cycles can be laid out as sinusoidal quadratic curves, whereby the variation of momentum for the drive can be optimized as well.

To further reduce the danger of accidents, it is recommended that the connection between the pusher and the belt be accomplished via an overload coupling that mechanically disengages and that can be re-engaged at only one place in the entire transport path. This ensures that the pusher is always synchronously engaged to the main drive.

In order that the pushers can fold away into their inactive position at the end of the transport path and then return again to the active position after the return run to a location behind the next product, two guide tracks are provided at different heights. These tracks extend over the entire length of the transport path, and have an adjustable shunt switch at their ends. This shunt switch makes it possible to divert a sliding block, that is connected with the pusher, from the lower guide track to the upper guide track, and vice versa, and thereby to generate the swinging movement of the pusher.

BRIEF DESCRIPTION OF THE DRAWINGS

The foregoing summary, as well as the following detailed description of a preferred embodiment of the invention, will be better understood when read in conjunction with the appended drawings, where like numerals indicate like elements throughout the several views. For the purpose of illustrating the invention, there is shown in the drawings an embodiment which is presently preferred. It should be understood, however, that the invention is not limited to the precise arrangements and instrumentalities shown. In the drawings:

FIG. 2 is a basic pictorial schematic of the pusher drive of the invention in side view;

FIG. 3 is the same basic pictorial schematic as in FIG. 2, but in top view; and

DETAILED DESCRIPTION OF THE PREFERRED EMBODIMENT

Figure 1:
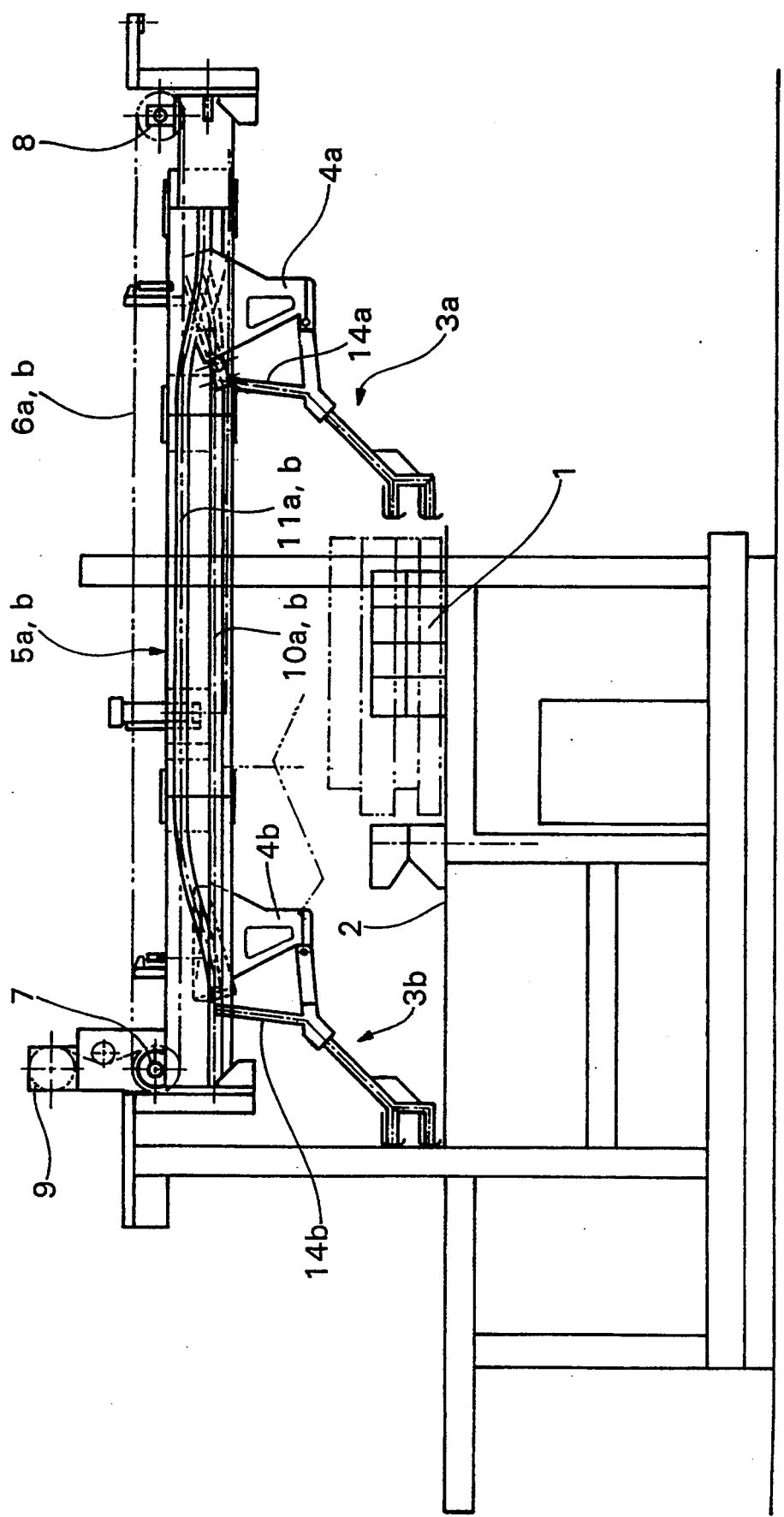
FIG. 1 is a side view of the entire installation incorporating the present invention.

In accordance with FIG. 1, the products to be packaged 1 are brought to the shown position on a track 2 in a manner that is not shown in detail. From there they are to be transported toward the left with the aid of the pushers 3a and 3b, which are described in more detail below, and are pushed into a previously manufactured bag (not shown) made of foil or paper.

Each of the pushers 3a and 3b is pivotably mounted on a cradle 4a or 4b in such a way that it can be swung upwards. For their part, each of these cradles can be moved horizontally along a guide 5a or 5b. Each of their drives takes place by means of a flexible traction mechanism in the form of a toothed belt 6a or 6b that runs over reversing pulleys 7, 8 at the ends and that carries out a back and forth movement, which is controlled by a servomotor 9. The guides 5a and 5b are arranged on both sides above the track 2; the same holds true for the toothed belts 6a and 6b.

The details of the drive can be seen from FIGS. 2 and 3, which are schematic representations that do not need to agree in detail with FIG. 1. As can be seen in these representations, the two endless toothed belts 6a and 6b with their respective reversing pulleys 7a, 8a or 7b, 8b are arranged above and on both sides of the track on which the products are transported. In connection with this, the toothed belt 6a is connected on its lower run with the cradle 4a, and the toothed belt 6b is connected on its upper run with the cradle 4b. Both toothed belts carry out a back and forth movement with a predetermined speed profile, in the course of which movement each of the pushers 3a and 3b alternately conveys a product from right to left and then returns again to the starting point.

Since the pushers extend inward towards the product track from the laterally arranged cradles 4a and 4b, to prevent collisions care must be taken that the pusher that is returning at a given time—that is, the pusher 3b in the embodiment shown—is swung upwards out of the product area, in the manner represented in FIGS. 2 and 3. The activation of this swinging movement is explained with the help of FIGS. 1 and 4. One can see that in each guide 5a and 5b, there is arranged a lower guide track 10a or 10b and an upper guide track 11a or 11b. The upper and the lower guide tracks both come together at their ends, where an adjustable shunt switch 12 is arranged in the area of their intersection.

Figure 4:
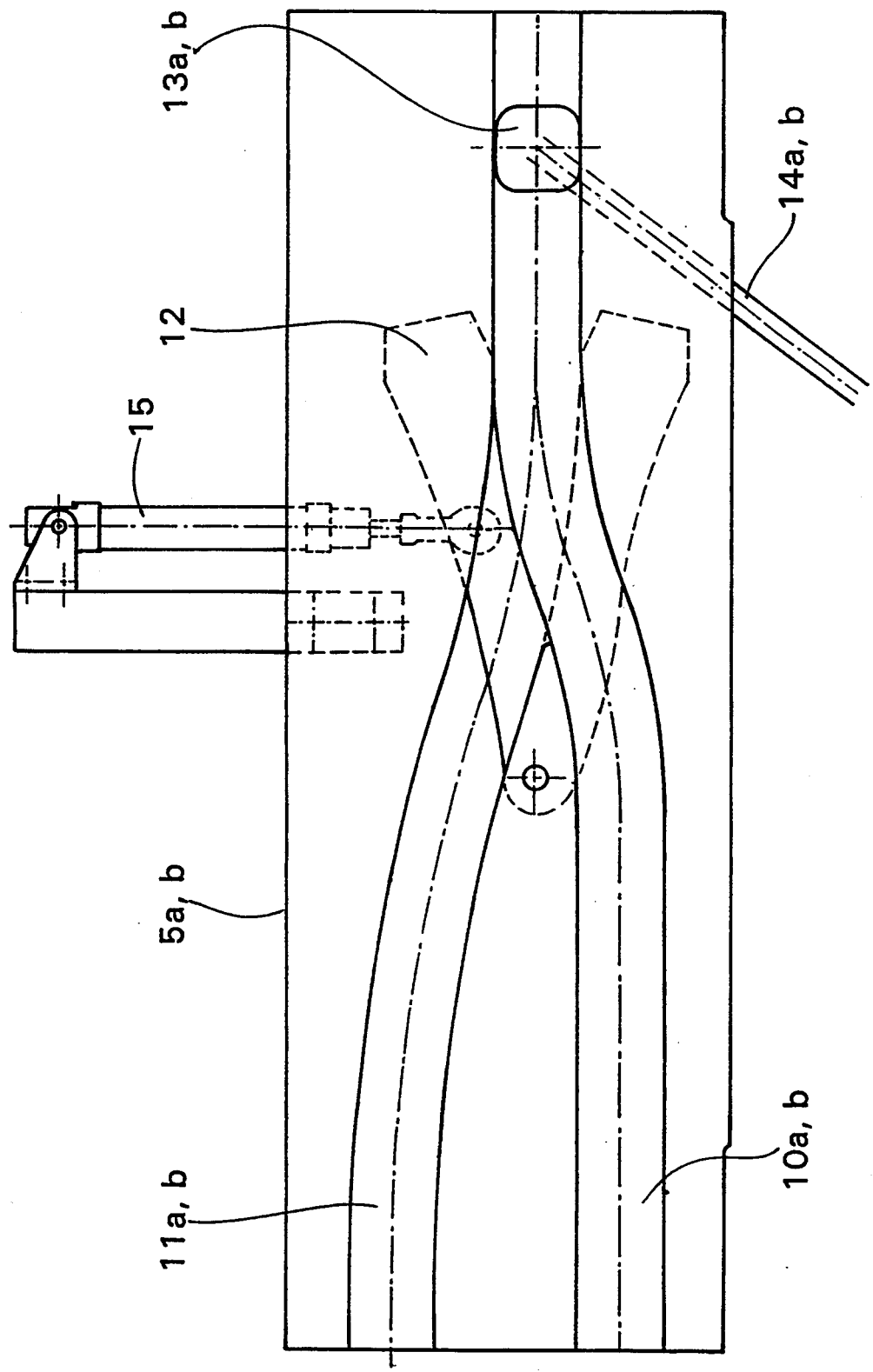
FIG. 4 is an enlarged section of the guide track of the invention for the swinging movement of the pushers.

Sliding blocks 13a and 13b run respectively in the track curves 10a and 11a, or 10b and 11b (as shown in FIG. 4). These sliding blocks are connected with respective pushers 3a and 3b and thus make their traveling movement along with cradles 4a and 4b. Each sliding block is pivotably connected to a lever 14a or 14b that is in turn rigidly linked to the pusher 3a or 3b and causes the pusher to swing upward. The functioning is as follows: When the sliding block 13a is in the position shown in FIG. 4, the shunt switch 12 is held in the shown upper position with the aid of an actuation element 15, so that at the beginning of its transport movement, the sliding block 13a is directed onto the lower guide track 10a. In a corresponding way, the pusher 3a swings into the lower active position, thus engaging the product 1 and proceeding to move it to the left to push it into the bag. A second shunt switch of the same type is arranged at the left end of the track curves 10 and 11, which directs the sliding block 13a onto the upper track curve 11a during the return stroke. When this takes place, the sliding block 13a pulls the lever 14a with it, and since the pusher 3a is rigidly connected to the lever 14a, the pusher is swung upward, thus attaining the position represented for the pusher 3b in FIGS. 2 and 3, where it can travel above the other pusher that is coming in the opposite direction, and back to the starting point. There, when the shunt switch 12 is swung down, it first proceeds into the interim position that is represented by the sliding block 13a shown in FIG. 4. At that point the shunt switch 12 snaps into the upper position and the procedure is repeated.

Finally, one more important feature of the invention is represented in FIG. 2, namely an overload coupling 16a or 16b that is built in between the cradle 4a or 4b on one side and the lower run or upper run of the toothed belt on the other. This coupling breaks the connection between the cradle and toothed belt if an impermissibly high resistance to movement arises at the pusher, particularly if it runs into an obstacle.

It will be appreciated by those skilled in the art from this disclosure that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. An apparatus for transporting products in a packaging process, the apparatus comprising first and second pushing assemblies, each pushing assembly comprising a cradle, a pusher pivotally attached to the cradle, a lever having first and second ends and fixedly attached at the first end to the pusher, a longitudinal guide track, the second end of the lever being pivotably coupled to the guide track for swinging the pusher between active and passive positions with respect to a longitudinal product track, and a traction mechanism drivingly coupled to the cradle for reciprocally driving the pusher in opposite longitudinal directions along the product track, the traction mechanism of the first pushing assembly and the traction mechanism of the second pushing assembly being arranged above and on each longitudinal side of the product track, the apparatus also comprising a common driving device drivingly connected to both traction mechanisms, each pusher in the active position being pivoted by the respective lever toward the product track and being driven by the respective traction mechanism in a pushing direction along the product track, each pusher in the passive position being pivoted by the respective lever away from the product track and being driven by the respective traction mechanism in a direction opposite the pushing direction to a starting point corresponding to a product to be moved.

2. The apparatus of claim 1 wherein each traction mechanism comprises a toothed belt.

3. The apparatus of claim 1 wherein each traction mechanism comprises upper and lower runs which circulate on reversing pulleys, wherein the cradle of the first pushing assembly is drivingly coupled to the upper run of the traction mechanism of the first pushing assembly, and wherein the cradle of the second pushing assembly is drivingly coupled to the lower run of the traction mechanism of the second pushing assembly.

4. The apparatus of claim 1 wherein each traction mechanism is driven by a servomotor with a programmable speed profile.

5. The apparatus of claim 1 wherein each cradle is drivingly coupled to a respective traction mechanism by an overload coupling device which disengages when overloaded.

6. The apparatus of claim 1 wherein the traction mechanism has two ends and a common joining element, whereby the ends are adjustably joined together by the joining element.

7. The apparatus of claim 6 wherein the traction mechanism comprises a toothed belt.

8. The apparatus of claim 1 wherein each guide track comprises a generally linear upper course, a generally linear lower course generally parallel with respect to the upper course, the upper and lower courses having adjacent first ends and adjacent second ends, and curved portions shuntingly connecting the upper and lower courses at the first ends and the second ends, and wherein the second end of the respective lever is pivotally coupled to a sliding block slidably coupled to the guide track and movable on and between the upper and lower courses, the respective pusher being pivoted to the passive position when the sliding block is on the upper course and being pivoted to the active position when the sliding block is on the lower course.

9. The apparatus of claim 8 further comprising a pivotable shunt switch associated with the curved portions for shunting the sliding block between the upper and lower courses, the shunt switch being pivotable into a first position to allow the sliding block to slide between the upper course and a shunt portion and into a second position to allow the sliding block to slide between the lower course and the shunt portion.

* * * * *